(12) United States Patent
Losio et al.

(10) Patent No.: US 9,962,902 B2
(45) Date of Patent: May 8, 2018

(54) PADDING ELEMENT FOR SEATS AND METHOD OF MANUFACTURING THE SAME

(71) Applicant: Technogel Italia S.r.l., Pozzoleone (IV) (IT)

(72) Inventors: Massimo Losio, Asolo (IT); Matteo Mason, Limena (IT)

(73) Assignee: TECHNOGEL ITALIA S.R.L., Pozzoleone (VI) (IT)

( * ) Notice: Subject to any disclaimer, the term of this patent is extended or adjusted under 35 U.S.C. 154(b) by 0 days. days.

(21) Appl. No.: 14/247,516

(22) Filed: Apr. 8, 2014

(65) Prior Publication Data

US 2014/0302271 A1    Oct. 9, 2014

(30) Foreign Application Priority Data

Apr. 8, 2013    (IT) .............................. VR2013A0084

(51) Int. Cl.
*B32B 3/02*    (2006.01)
*B32B 3/24*    (2006.01)
(Continued)

(52) U.S. Cl.
CPC .............. *B32B 3/26* (2013.01); *B29C 39/006* (2013.01); *B29C 39/025* (2013.01);
(Continued)

(58) Field of Classification Search
None
See application file for complete search history.

(56) References Cited

U.S. PATENT DOCUMENTS

| 1,970,754 A | * | 8/1934 | Myers Jonasen | ......... A61F 5/48 |
| | | | | 119/527 |
| 2,585,691 A | * | 2/1952 | Scholl | ................... A61F 13/063 |
| | | | | 128/894 |

(Continued)

FOREIGN PATENT DOCUMENTS

| EP | 1060859 A2 * | 12/2000 | ............. A47C 7/021 |
| EP | 1060859 A2   | 12/2000 | |

(Continued)

OTHER PUBLICATIONS

Machine Translation of JP 2005052183 A, Mar. 2005.*

(Continued)

*Primary Examiner* — Jeffrey A Vonch
(74) *Attorney, Agent, or Firm* — Tutunjian & Bitetto, P.C.

(57) ABSTRACT

Padding element for seats such as sofas, armchairs, chairs and armrests, wherein such seats have a support structure, or similar support structure for the human body or parts thereof, such as rest or anti-fatigue mats, anti-decubitus mattresses, shower mats, anti-impact mats, wherein the padding element is provided with a support surface for a user, wherein the padding element includes one film or covering, one gel layer adhering to part of the film or covering and one compact elastomeric layer having a surface for contact with the gel layer and with part of the film or covering and one surface for contact with the seat and/or with the support structure of the seat, wherein the compact elastomeric layer adheres to the gel layer and the film or covering; method for obtaining such padding element.

24 Claims, 3 Drawing Sheets

(51) Int. Cl.
*B32B 3/26* (2006.01)
*B32B 3/30* (2006.01)
*B32B 7/04* (2006.01)
*B32B 27/06* (2006.01)
*B32B 27/40* (2006.01)
*B32B 7/02* (2006.01)
*B29C 39/02* (2006.01)
*B29C 39/00* (2006.01)
*B29C 41/50* (2006.01)
*B32B 27/08* (2006.01)
*B32B 27/12* (2006.01)
*B29C 51/10* (2006.01)
*B29C 39/10* (2006.01)
*B29K 105/24* (2006.01)
*B29L 9/00* (2006.01)
*B29K 21/00* (2006.01)
*B29L 7/00* (2006.01)
*B29L 31/00* (2006.01)
*B29C 51/16* (2006.01)
*A47C 27/15* (2006.01)
*B29C 41/20* (2006.01)
*B29C 41/22* (2006.01)
*B29K 75/00* (2006.01)
*B29L 31/58* (2006.01)

(52) U.S. Cl.
CPC ............ *B29C 39/026* (2013.01); *B29C 41/50* (2013.01); *B32B 3/02* (2013.01); *B32B 3/263* (2013.01); *B32B 3/30* (2013.01); *B32B 7/02* (2013.01); *B32B 7/04* (2013.01); *B32B 27/40* (2013.01); *A47C 27/15* (2013.01); *B29C 39/10* (2013.01); *B29C 41/20* (2013.01); *B29C 41/22* (2013.01); *B29C 51/10* (2013.01); *B29C 51/16* (2013.01); *B29K 2021/003* (2013.01); *B29K 2021/006* (2013.01); *B29K 2075/00* (2013.01); *B29K 2105/24* (2013.01); *B29K 2105/246* (2013.01); *B29K 2995/007* (2013.01); *B29K 2995/0046* (2013.01); *B29L 2007/00* (2013.01); *B29L 2009/00* (2013.01); *B29L 2009/008* (2013.01); *B29L 2031/58* (2013.01); *B29L 2031/737* (2013.01); *B29L 2031/7324* (2013.01); *B29L 2031/751* (2013.01); *B29L 2031/771* (2013.01); *B32B 27/08* (2013.01); *B32B 27/12* (2013.01); *B32B 2250/03* (2013.01); *B32B 2250/24* (2013.01); *B32B 2250/44* (2013.01); *B32B 2255/26* (2013.01); *B32B 2305/72* (2013.01); *B32B 2307/51* (2013.01); *B32B 2307/536* (2013.01); *B32B 2375/00* (2013.01); *B32B 2471/04* (2013.01); *B32B 2479/00* (2013.01); *Y10T 428/22* (2015.01); *Y10T 428/239* (2015.01); *Y10T 428/2457* (2015.01); *Y10T 428/24322* (2015.01); *Y10T 428/24479* (2015.01); *Y10T 428/24612* (2015.01); *Y10T 428/24983* (2015.01); *Y10T 428/31551* (2015.04); *Y10T 428/31554* (2015.04)

(56) References Cited

U.S. PATENT DOCUMENTS

| 3,663,973 | A | * | 5/1972 | Spence | A47C 27/14 |
| | | | | | 5/655.5 |
| 3,679,263 | A | * | 7/1972 | Cadiou | A47C 7/282 |
| | | | | | 297/452.48 |
| 4,422,194 | A | * | 12/1983 | Viesturs | A47C 27/085 |
| | | | | | 5/654 |
| 4,456,642 | A | * | 6/1984 | Burgdorfer | A61G 7/05738 |
| | | | | | 428/194 |
| 4,471,538 | A | * | 9/1984 | Pomeranz | A43B 13/189 |
| | | | | | 188/322.5 |
| 4,910,060 | A | * | 3/1990 | Nakanishi | B29C 65/02 |
| | | | | | 428/447 |
| 4,913,755 | A | * | 4/1990 | Grim | A61F 5/0111 |
| | | | | | 156/145 |
| 4,952,439 | A | * | 8/1990 | Hanson | B62J 1/18 |
| | | | | | 297/214 |
| 5,027,801 | A | * | 7/1991 | Grim | A61F 5/0111 |
| | | | | | 602/16 |
| RE35,113 | E | * | 12/1995 | Grim | A61F 5/0111 |
| | | | | | 602/14 |
| 5,645,914 | A | * | 7/1997 | Horowitz | A47G 27/0231 |
| | | | | | 428/172 |
| 5,678,266 | A | * | 10/1997 | Petringa | A47C 7/021 |
| | | | | | 297/219.1 |
| 5,756,184 | A | * | 5/1998 | Yates | A47B 21/0371 |
| | | | | | 428/188 |
| 5,885,675 | A | * | 3/1999 | Martin | G02C 5/00 |
| | | | | | 156/242 |
| 5,976,288 | A | * | 11/1999 | Ekendahl | B32B 27/40 |
| | | | | | 156/78 |
| 6,089,516 | A | * | 7/2000 | Yates | G06F 3/039 |
| | | | | | 248/118 |
| 6,093,468 | A | * | 7/2000 | Toms | A41D 13/0158 |
| | | | | | 2/22 |
| 6,136,426 | A | * | 10/2000 | Bigolin | B62J 1/26 |
| | | | | | 264/271.1 |
| 6,266,897 | B1 | * | 7/2001 | Seydel | A43B 13/16 |
| | | | | | 36/25 R |
| 6,290,794 | B1 | * | 9/2001 | Yates | B62J 1/002 |
| | | | | | 156/145 |
| 6,409,865 | B1 | * | 6/2002 | Yates | B62J 1/00 |
| | | | | | 156/214 |
| 6,444,303 | B1 | * | 9/2002 | Ali | A23D 9/013 |
| | | | | | 428/318.4 |
| 6,472,581 | B1 | * | 10/2002 | Muramatsu | A61L 15/26 |
| | | | | | 602/41 |
| 6,506,271 | B1 | * | 1/2003 | Yates | B32B 25/08 |
| | | | | | 156/77 |
| 6,547,327 | B1 | * | 4/2003 | Yates | B62J 1/20 |
| | | | | | 297/200 |
| 6,598,321 | B2 | * | 7/2003 | Crane | A43B 7/1415 |
| | | | | | 36/27 |
| 6,677,026 | B1 | * | 1/2004 | Yates | A47C 27/085 |
| | | | | | 297/452.41 |
| 6,681,416 | B1 | * | 1/2004 | Yang | A47K 3/002 |
| | | | | | 4/581 |
| 7,291,376 | B1 | * | 11/2007 | Siegel | A47L 23/266 |
| | | | | | 428/156 |
| 7,682,680 | B2 | | 3/2010 | McMahan | |
| 7,739,754 | B2 | * | 6/2010 | Garneau | A41D 13/0537 |
| | | | | | 2/215 |
| 7,757,311 | B2 | * | 7/2010 | Garneau | A41D 1/084 |
| | | | | | 2/215 |
| 2001/0018466 | A1 | * | 8/2001 | Gansen | B32B 5/32 |
| | | | | | 521/137 |
| 2002/0061384 | A1 | * | 5/2002 | Yates | B32B 25/08 |
| | | | | | 428/76 |
| 2002/0176981 | A1 | * | 11/2002 | Ali | A23D 9/013 |
| | | | | | 428/318.6 |
| 2003/0005549 | A1 | * | 1/2003 | DeLuca | A47C 7/02 |
| | | | | | 16/430 |
| 2004/0098806 | A1 | * | 5/2004 | Stender | A47C 7/021 |
| | | | | | 5/654 |
| 2004/0209062 | A1 | * | 10/2004 | Sebag | B29C 44/086 |
| | | | | | 428/304.4 |
| 2006/0031994 | A1 | * | 2/2006 | Willat | A61B 17/2841 |
| | | | | | 5/655.5 |
| 2007/0061978 | A1 | * | 3/2007 | Losio | A47C 21/046 |
| | | | | | 5/655.5 |
| 2007/0066788 | A1 | * | 3/2007 | Hoffmann | C08G 18/10 |
| | | | | | 528/49 |
| 2007/0226911 | A1 | | 10/2007 | Gladney et al. | |

(56) References Cited

U.S. PATENT DOCUMENTS

| | | | |
|---|---|---|---|
| 2008/0034614 A1* | 2/2008 | Fox | A43B 1/0027 36/43 |
| 2008/0078028 A1* | 4/2008 | McMahan | A47G 27/0231 5/420 |
| 2008/0113170 A1* | 5/2008 | McMahan | A47G 27/0231 428/217 |
| 2009/0035524 A1* | 2/2009 | Wyner | A41D 13/082 428/156 |
| 2009/0039688 A1* | 2/2009 | Wyner | A41D 13/082 297/219.11 |
| 2009/0255625 A1* | 10/2009 | Fox | A43B 13/187 156/247 |
| 2009/0320324 A1* | 12/2009 | Yang | A43B 13/189 36/44 |
| 2009/0324941 A1* | 12/2009 | Benoit | B29C 67/24 428/339 |
| 2010/0237082 A1 | 9/2010 | Fernandez | |
| 2011/0001347 A1* | 1/2011 | Choi | A47C 7/024 297/452.61 |
| 2011/0038904 A1* | 2/2011 | Matteliano | A43B 7/1455 424/401 |
| 2011/0252568 A1* | 10/2011 | Ramp | A47C 20/027 5/655.3 |
| 2012/0060293 A1* | 3/2012 | Stelter | A61G 7/072 5/652.1 |
| 2012/0084896 A1* | 4/2012 | Wyner | A63B 71/08 2/16 |
| 2012/0244324 A1* | 9/2012 | Chen | B32B 5/02 428/178 |
| 2012/0276328 A1* | 11/2012 | Chen | A41D 13/0156 428/131 |
| 2012/0315460 A1* | 12/2012 | LaFlamme | B32B 7/045 428/304.4 |
| 2013/0000045 A1* | 1/2013 | Losio | A47C 21/046 5/655.3 |
| 2013/0005900 A1* | 1/2013 | Mueller | C08G 18/10 524/590 |
| 2013/0061377 A1* | 3/2013 | Wyner | A41D 13/015 2/455 |
| 2013/0232697 A1* | 9/2013 | Chen | A47C 27/085 5/654 |
| 2014/0325763 A1* | 11/2014 | Mason | A47C 27/085 5/652.1 |
| 2015/0082523 A1* | 3/2015 | Wyner | B32B 3/04 2/455 |
| 2015/0368465 A1* | 12/2015 | Ausmeier | C08L 75/04 428/76 |
| 2016/0183691 A1* | 6/2016 | Mason | A47C 27/085 5/655.5 |
| 2016/0192714 A1* | 7/2016 | Williams | A41B 9/12 2/455 |

FOREIGN PATENT DOCUMENTS

| | | | | |
|---|---|---|---|---|
| EP | 1407867 A2 | * | 4/2004 | B29C 44/1238 |
| EP | 2388375 A1 | * | 11/2011 | E01C 13/02 |
| FR | 2598910 A1 | * | 11/1987 | A47C 4/54 |
| FR | 2841507 A1 | * | 1/2004 | A47C 7/18 |
| JP | 07039438 A | * | 2/1995 | |
| JP | 2004350956 A | | 12/2004 | |
| JP | 2005052183 A | * | 3/2005 | |
| KR | 20030065162 A | * | 8/2003 | |

OTHER PUBLICATIONS

Dureflex PS5400, Oct. 2015.*
White, Rick, Shore Durometer Conversion Chart, Oct. 2011.*
Mechanical Rubber, Durometer* Conversion Chart, Aug. 2013.*
International Search Report dated Jul. 1, 2013 for Italian Application No. VR201300084.

* cited by examiner

PADDING ELEMENT FOR SEATS AND METHOD OF MANUFACTURING THE SAME

TECHNICAL FIELD OF THE INVENTION

The present invention relates to a padding element for seats, such as sofas, armchairs, chairs and armrests, or for supports for the human body such as rest or anti-fatigue mats, anti-decubitus mattresses, shower mats, anti-impact mats, etcetera.

In particular, the present invention relates to a padding element for seats or supports for the human body, capable of conferring a particular comfort and a determined aesthetic aspect.

The present invention further relates to a method of obtaining a padding element for seats or supports for the human body according to the present invention.

DESCRIPTION OF RELATED ART

Various types of paddings for seats or supports for the human body are available in the market.

Such paddings may be made of conventional materials, i.e., foams of various origins, latex, natural material such as wool, cotton, feathers, etcetera. In most cases, such paddings of the known type are kept by a fabric casing, synthetic or natural, or by other suitable materials, having the desired aesthetic qualities. Other types of seats or support, such as saddles, mattresses, wheelchairs, anti-decubitus elements, etcetera, may have a layer made of gel material, resulting from the reaction of polyols and polyisocyanates and used for various applications, especially in elements capable of distributing the pressure exerted thereon.

Actually, the gel has mechanical characteristics capable of allowing a suitable support and three-dimensional distribution of the weight of a user, thereby making the element, on which the gel is applied or in which it is comprised, comfortable.

Such gel layer is usually coupled to an expanded foam layer, with the aim of reducing the overall weight of the seat, lowering the production costs thereof, etcetera.

In U.S. Pat. No. 7,682,680 there is described, for example, an anti-fatigue mat comprising a first flexible sheet, an elastic gel layer located on the first flexible sheet and having a first predetermined hardness, a flexible barrier layer arranged on the elastic gel layer; the flexible barrier layer adhered to the elastic gel layer and it has a second predetermined hardness different from the first predetermined hardness of the elastic gel layer. The second flexible sheet is located on the flexible barrier layer, which is moveable with respect to the second flexible sheet.

SUMMARY OF THE INVENTION

The technical task of the present invention is, thus, to provide a padding element capable of overcoming the drawbacks of the prior art.

Within this technical task, providing a padding element comprising a polyurethane gel layer coupled to a polyurethane compact elastomeric material layer constitutes a particular object of the present invention.

In addition, a further object of the present invention is to provide a padding element that is comfortable and having a pleasant aesthetic aspect or the desired characteristics.

This object is attained by the padding element for seats according to the present principles.

Within such technical task, providing a method for obtaining a padding element comprising a polyurethane gel layer coupled to a polyurethane compact elastomeric material layer constitutes a particular object of the present invention.

In addition, a further object of the present invention is to provide a method for obtaining a padding element that is comfortable and having a pleasant aesthetic aspect or desired characteristics.

A further object of the present invention is to provide a method for obtaining a padding element that is simple and quick to implement.

This object is attained by the method for obtaining a padding element for seats or supports for the human body according to the present principles.

Further advantageous characteristics are described in the dependent claims.

BRIEF DESCRIPTION OF THE DRAWINGS

The characteristics of the invention shall be clearer to those skilled in the art from the following description and the attached drawings, provided by way of non-limiting example, wherein.

DETAILED DESCRIPTION OF THE INVENTION

With respect to the attached figures, a padding element according to the present invention is indicated with 1.

The present invention regards a padding element for seats such as sofas, armchairs, chairs, armrests, and etcetera or for supports for the human body such as rest or anti-fatigue mats, anti-decubitus mattresses, shower mats and anti-impact mats.

More generally, the padding element according to the present invention refers to a padding element of a support for sustaining the body of a person or parts thereof, such as a panel, a mattress, a cushion, a seat surface of a seat, an armchair, a saddle for vehicles and the like, anti-fatigue mats, shower mats, anti-impact mats etcetera.

In the description that follows, explicit reference shall be made to obtaining a padding element for seats but the skilled person shall easily understand how a padding element according to the present invention can be equally used also for obtaining rest mats, shower mats, anti-impact mats, etc.

The padding element 1 is provided with a support surface 2 for a user and a surface 3, opposite to the support surface 2.

The surface 3 is a surface for supporting and/or adhering and/or fixing to a support structure for the human body or parts thereof, such as a sofa framework, an armchair framework, a seat, an armrest support, a floor, a shower or bath tub surface etcetera.

Figure 4:
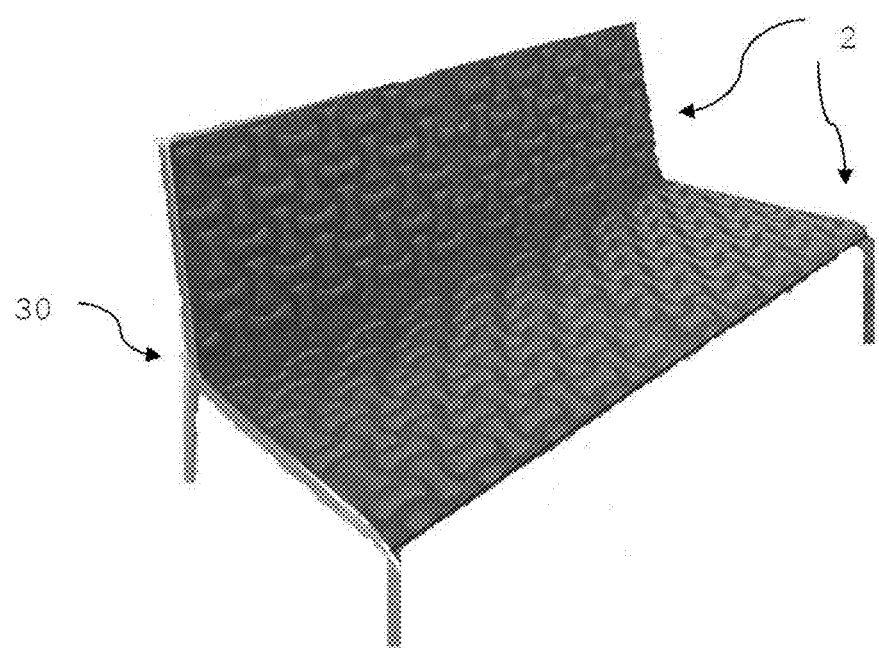
FIG. 4 is a perspective view of the padding element of FIG. 2 positioned in a support structure.

Such support structure, illustrated by way of example, in FIG. 4 in the form a sofa framework, is indicated in its entirety with 30.

The padding element 1 comprises a film or covering 4.

The film or covering 4 comprises a film made of polyurethane or a waterproof fabric, for example a high elasticity fabric, a fabric made of elastane polyester, an elastic net or a fabric of the "fleece" type, a fabric spread-coated with a waterproofing material, a fabric spread-coated with a polyurethane material, or a polyurethane paint, etcetera.

The use of waterproof fabric reduces the risk of breakage by cutting, tearing, permanent deformation, etcetera. The fabric spread-coated may be spread-coated or laminated or coupled with a polyurethane material both internally and externally and in both sides of the fabric, with respect to the support surface 2. Thus, for example, in some preferred embodiments of the present invention, the spread-coated fabric has, at the support surface 2, its surface made of fabric facing towards the user and i.e. facing externally with respect to the support surface 2, while its spread-coated side facing internally with respect to the support surface, i.e. towards the surface 3.

The film or covering 4 corresponds to the support surface 2 for a user.

When the film or covering 4, in contact with the gel and the compact elastomer, as better specified hereinafter, is a fabric, the latter may be impregnated by the gel and/or by the elastomer.

The film or covering 4, on the side in contact with the user, or the support surface 2, may have a finishing or surface grain having the desired characteristics. Actually, such support surface 2 or such film or covering 4 confer to the padding element 1 the desired aesthetic characteristics which make it also applicable to furnishing elements or seats or mats in general.

The film or covering 4 may be shiny or glossy or opaque, or coloured variously, may be at least partly transparent or covering or it may show a "watermark" transparency, i.e. a transparency which, though showing a covering aspect, lets part of the light which traverses it pass through.

The film or covering 4 is thermoformed under vacuum. The padding element 1 is further provided with a gel layer 5.

The gel layer 5 adheres to at least part of the inner side of the film or covering 4. Preferably, the gel layer 5 adheres to part of the film or covering, in the inner side of the film or covering 4 and i.e. the one opposite the support surface 2 of the user.

The gel layer 5 comprises a polyurethane gel. Such gel of the gel layer 5 shows a hardness D' calculated as Shore 00 equal to zero.

In particular, such gel shows a hardness D' calculated as Shore 000 lower than 60.

It is, thus, a very soft gel, capable of conferring a high degree of comfort for the user.

Such gel layer 5 is associated to such film or covering 4.

The gel of the gel layer 5 is a soft, compact and very elastic material, capable of deforming in a three-dimensional manner when subjected to a force.

The gel layer 5 may be at least partly transparent or covering and, depending on the case, it may be variously coloured.

In a version of the invention, the gel layer 5 has dimensions smaller than those of the film or covering 4. In particular, only some portions of the film or covering 4 may be covered by the gel layer 5. Thus, the gel layer may be only located in some areas of the film or covering 4 and/or of the padding element 1.

The padding element 1 further comprises a compact elastomeric layer 6. In the present description and in the claims that follow the expression "compact" is used to indicate a "non-expanded" material.

Such compact elastomeric layer 6 adheres to the gel layer 5 and a part of the film or covering 4. In particular, the adhesion between the gel layer 5 and the compact elastomeric layer 6 occurs on the side of the gel layer opposite with respect to that of the film or covering 4.

The fact that the compact elastomeric layer 6 adheres to at least part of the gel layer 5 and to the film or covering 4 allows obtaining a padding element 1 in which some areas for contact with the user are formed by the gel and other areas, for contact or no contact with the user, are formed by the compact elastomer.

In particular, the compact elastomeric layer 6 has a surface 7 facing towards the gel layer 5 or towards the film or covering 4, in which such surface has portions for contact with the gel layer 5 and portions for contact with part of the film or covering 4.

The compact elastomeric layer 6 additionally has a surface 8 for contact with the support structure 30. The surface 8 corresponds to the surface 3 of the padding element 1.

The compact elastomeric layer 6 is compact, in the sense that it does not allow the infiltration of liquids, humidity or air or deteriorating agents thereinto. Accordingly, the compact elastomeric layer 6 does not have open cells and it is not expanded. The compact elastomeric layer 6 has a hardness D" greater than hardness D' of the gel layer 5.

In particular, the hardness D" of the compact elastomeric layer 6 is calculated as Shore 00 greater than 10.

The compact elastomeric layer 6 comprises a polyurethane elastomer.

The compact elastomeric layer 6 may be adhesive or anti-slip or non-adhesive, depending on the hardness and/or the composition of the elastomer itself.

The compact elastomeric layer 6 may be transparent or covering and, where necessary, it may be variously coloured.

In a version of the invention, the film or covering and the gel layer 5 are transparent and only the compact elastomeric layer 6 has a colour.

The overall aspect of the padding element 1 is, however, coloured, since the transparency of the gel layer 5 and the film or covering 4 allow the vision of the colouring of the compact elastomeric layer 6.

Moreover, through such version, the aesthetic aspect of the padding element 1 is particular, in that the transparent materials 4, 5 can create light effects with respect to the coloured layer of the compact elastomer 6. The surface 8 of the compact elastomer 6, which corresponds to the surface 3 of the padding element 1 may have anti-slip characteristics which make the padding element suitable for use as a mat.

The padding element 1 may comprise, in a version of the invention, a coating layer 9 for closing the padding element 1.

The coating layer 9 may comprise paint capable of conferring a surface finishing to the padding element 1 or to the compact elastomeric layer 6 with the aim of obtaining adhesion or different sliding with the support surfaces with which the padding element 1 or the compact elastomeric layer 6 come into contact.

The coating layer 9 can also be transparent or covering.

The coating layer 9 comprises a polyurethane coating or a polyurethane paint.

In the version wherein the compact elastomeric layer 6 is not adhesive, the coating layer 9 may not be present.

The padding element 1 has dimensions substantially corresponding to those of the support structure that it coats.

Moreover, the compact elastomeric layer 6 has, generally, dimensions corresponding to those of the support structure that it coats.

In particular, in fact, the padding element 1 covers the exposed areas or the support areas of the support structure of the seat in question.

For example, in the embodiment of FIG. 4, the padding element 1 adheres and/or covers the exposed part of the support structure 30, i.e. the exposed and support areas of the sofa in question.

In a version of the invention, the film or covering 4 and/or the coating layer 9 may have dimensions greater than those of the gel layer 5 and/or the compact elastomeric layer 6 and/or the support structure 30. Thus, the film or covering 4 and/or the coating layer 9 may be used as coating for the support structure 30 in the areas thereof that do not support the user, or as means for locking the padding element 1 with respect to the support structure 30, or even as protection for the latter.

The padding element 1, and in particular the compact elastomeric layer 6, is flexible, i.e. it is capable of following the shape, even sinuous, of the support structure 30 without breaking, cracking, being ruined or being subjected to any other blemishing effects.

Being obtained through a single process, as described more in detail hereinafter, the materials that form the padding element 1 must be compatible with respect to each other in order to adhere to each other and obtain a monolithic body.

The padding element 1 is, in fact, a monolithic body.

Between the gel layer 5 and the film or covering 4 and/or between the gel layer 5 and the elastomer layer 6 there may be inserted or positioned at least one decoration element such as, an ornamental insert, a logo, a label, a writing, a colour, an advertisement element or other. Such at least one decoration element may be of different type.

Such at least one decoration element may be two or three-dimensional.

Such at least one decoration element is visible to the user, i.e. through the support surface 2, due to the transparency or semi-transparency of at least part of the materials that form the padding element 1.

The gel layer 5 is associated to part of the film of coating 4.

The gel layer 5 and the film or covering 4 comprise a distribution of heads 10 for contact with parts of the body of the user defined between air circulation grooves 11.

The heads 10 and the grooves 11 may be of any shape and geometry, with the aim of varying the relationship between the areas of the contact surface and the surface intended for the ventilation of the padding element 1 as desired.

In addition, the heads 10 can comprise furrows (not illustrated), adapted to provide further circulation of air between the heads 10 and the parts of the body of the user supporting them.

The heads 10 and the grooves 11 are formed by the film or covering 4 and by the gel layer 5.

In a version of the invention, the gel layer 5, in the position underlying the grooves 11, with respect to the support surface 2, may have a base thickness which makes the lower surface of the gel layer flat. Thus, this guarantees the perfect adhesion between such flat surface of the gel layer 5 and the compact elastomeric layer 6. The grooves 11 can be formed, in a further version of the invention, by the film or covering 4 and the compact elastomeric layer 6.

Figure 1:
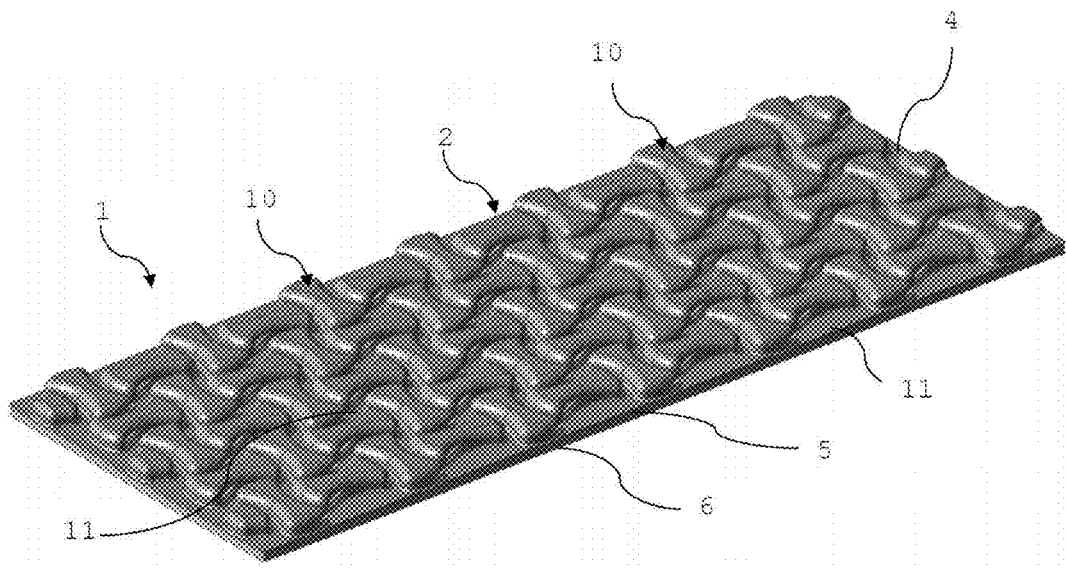
FIG. 1 is a perspective view of the padding element according to the present invention.
Figure 2:
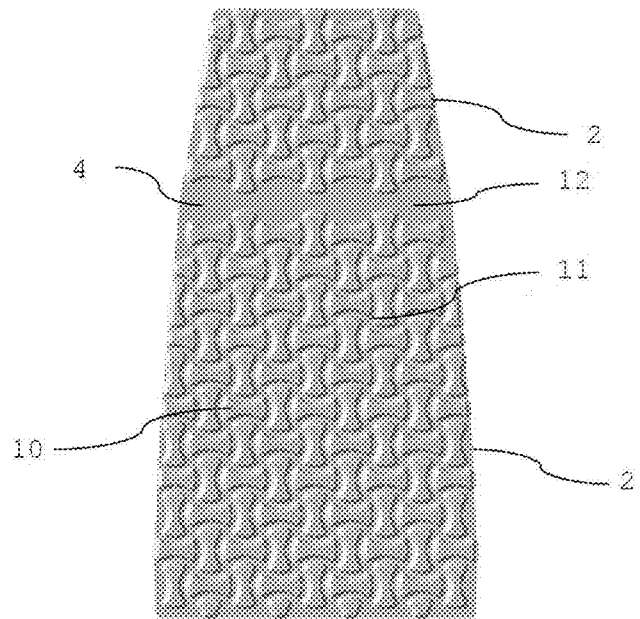
FIG. 2 is a front view of the padding element according to a version of the present invention.
Figure 3:
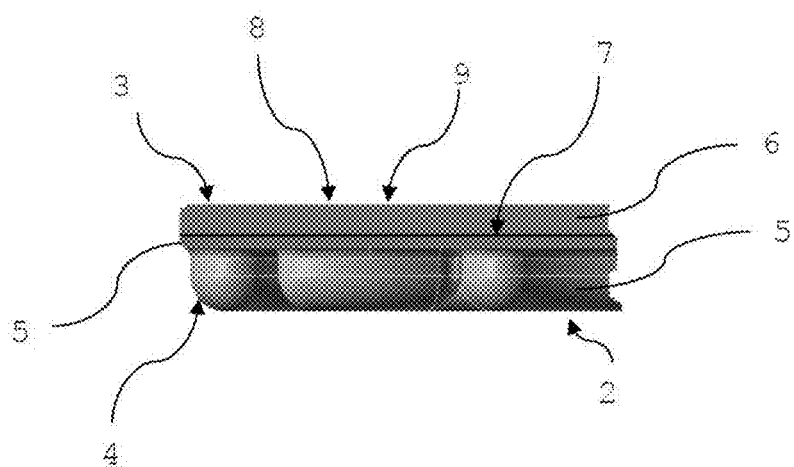
FIG. 3 is a lateral view of an enlarged detail of the padding element according to FIG. 1 or 2.

In the version illustrated in FIG. 2, the padding element 1 has at least one of its areas 12 without heads 10 and grooves 11 and/or without the gel layer 5.

Such area 12 is adapted to be arranged at the possible folding area of the padding element 1, with the aim of avoiding the overall dimension of the heads 10. Alternatively, such area 12 is adapted to be arranged at the areas of the padding element 1 wherein the gel layer 5 is not present.

Furthermore, the heads 10 and the grooves 11 can have a given configuration or arrangement, so as to better adapt to the support structure 30 or to the type of support to be conferred to the user.

The compact elastomeric layer 6 has a sheet configuration having a substantially planar surface.

On the surface 9 of the compact elastomeric layer 6 and/or on the contact surface of the support structure 30, designed to be coated with the padding element 1, there can be applied glue, instantaneous glue, bi-adhesive tapes, or releasable adhesive means, or locking means, of the fixed or releasable type, capable of determining the coupling of the compact elastomeric layer 6, and the entire padding element 1, to the support structure 30.

In a further version of the invention, between the film or covering 4 and the compact elastomeric layer 6 or between the film or covering 4 and the gel layer 5 or between the gel layer 5 and the compact elastomeric layer 6 there is an adhesion primer between such elements. Such primer may be a polyurethane primer.

Such solution allows to obtain a perfect adhesion between the film or covering 4 and the compact elastomeric layer 6 or between the film or covering 4 and the gel layer 5 or between the gel layer 5 and the compact elastomeric layer 6, also on the edge perimeter areas of the padding element 1. Actually, in such areas the gel layer 5 may not be present.

The present invention further refers to a method for obtaining the padding element 1 for seats or supports for the human body.

Such method comprises a step of preparing a film or covering 4.

Such step may be obtained by inserting or spraying the film or covering 4 in a mould.

According to an embodiment of the present invention, the method comprises a step for thermoforming the film or covering 4 under vacuum. This step occurs by heating the mould and/or the film or covering 4, by actuating a pump capable of creating the vacuum between the mould and the film or covering 4, so that the latter is forced towards the mould, thus taking a shape corresponding to that of the surface of the mould.

The method according to the present invention further comprises a step of pouring the gel on the part of the film of coating 4. Such pouring occurs through the conventional technologies suitable for the purpose. Such pouring occurs on at least part of the film or covering 4.

A step in which the gel is subjected to cross-linking, hardening and compacting, up to forming the gel layer 5 then occurs.

Such gel layer determines a comfort element for the user, in that it is capable of deforming in a three-dimensional manner, as indicated above, if subjected to a force.

Simultaneously, the film or covering 4 and/or the gel layer 5 also have/has a decoration or aesthetic value, having a configuration or surface finishing having a decoration value.

In addition, such elements can be personalized to suit the comfort and/or aesthetic needs, thus meeting the taste of the user.

The gel layer 5 adheres and it is associated to at least part of the film or covering 4 and acquires the shape or configuration acquired by the latter.

The method according to the present invention comprises a step of pouring an elastomer. Such pouring occurs on the gel layer 5 and on the film or covering 4.

It occurs after a step in which the elastomer hardens, thereby compacting, up to forming the compact elastomeric layer 6.

The compact elastomeric layer 6 adheres to the gel layer 5, in particular on the opposite side with respect to the film or covering 4.

The compact elastomeric layer 6 adheres to at least part of the film or covering 4.

The method according to the present invention may comprise a step of coating or spraying or painting the compact elastomeric layer 6.

Such step is performed on the surface 8 of the compact elastomeric layer 6, which is positioned opposite with respect to the gel layer 5.

Such coating or spraying or painting step determines the formation of a coating layer 9.

Subsequently, a step of trimming the padding element 1, with the aim of conferring it the desired dimensions, may follow.

In particular, such trimming step comprises trimming the film or covering 4 and/or the coating layer 9, so as to acquire the same dimensions as the compact elastomeric layer 6.

The method according to the present invention may comprise a step of inserting and/or positioning at least one decoration element, an ornamental insert, a logo, a label, a writing, a colour, an advertisement element or anything else, of the two and/or three-dimensional type, between the gel layer 5 and the film or covering 4 and/or between the gel layer 5 and the compact elastomeric layer 6.

Such at least one decoration element is visible to the user, through the support surface 2, due to the transparency or semi-transparency of at least part of the materials that form the padding element 1.

The method according to the present invention comprises the steps of providing at least one female mould for the insertion, arrangement or thermoforming of the film or covering 4 and for pouring the gel layer 5 and the compact elastomeric layer 6.

In fact, contrary to the conventional methods which use male and female moulds for obtaining a padding element, all the steps of the method according to the present invention occur, in a version of the invention, in a single mould, so as to obtain a padding element 1 in a monolithic piece.

The mould according to the present invention is provided with at least one distribution of projections or reliefs, corresponding to the grooves 11 present in the film or covering 4 and in the gel layer 5 and/or in the compact elastomeric layer 6, having a first predetermined height.

The mould may also comprise a distribution of valleys, designed to form, in the film or covering 4 and in the gel layer 5, the heads 10 for contact with parts of the body of the user defined between corresponding air circulation grooves 11.

Such valleys are substantially located at the intersection of the aforementioned projections or reliefs.

The mould may also comprise a distribution of crests, designed to form, on the heads 10, corresponding air circulation furrows between the heads 10 and the parts of the body of the user resting thereon.

The step of pouring the gel in the mould, so as to obtain the gel layer 5, can occur by pouring an amount of gel with height equal to that of the projections or reliefs of the mould, so as to cover them and entirely fill the space present in the mould between them, i.e. so as to fill the valleys of the mould with gel.

In an alternative version, the height of the gel exceeds the height of the projections, thus obtaining, in a position underlying the grooves 11 with respect to the support surface 2 of the padding element 1, a base thickness of the gel layer.

In a further version of the invention, the method comprises a step of positioning or inserting or spraying or applying, between the film or covering 4 and the compact elastomeric layer 6 or between the film or covering 4 and the gel layer 5 or between the gel layer 5 and the compact elastomeric layer 6, an adhesion primer between such elements.

Thus, there is obtained a perfect adhesion between the film or covering 4 and the compact elastomeric layer 6 or between the film or covering 4 and the gel layer 5 or between the gel layer 5 and the compact elastomeric layer 6, even in the edge perimeter areas of the padding element 1. Actually, in such area the gel layer 5 may not be present.

The compact elastomeric layer 6 acquires a sheet configuration having a substantially planar surface.

According to a preferred example of implementation of the method according to the present invention, the step of preparing a film or covering 4 comprises the sub-steps of preparing an elastic fabric made of elastane polyester and cover it, for example through spread coating, with a polyurethane material.

The method provides a subsequent step for thermoforming the film or covering 4 under vacuum.

Subsequently, the pouring of a gel 5 on part of the film or covering 4 is provided, thereby waiting for a period of time for the cross-linking and the hardening of the gel 5.

Thus, the method according to the present invention comprises a step of pouring an elastomer on the gel layer 5 and on the film or covering 4 made of fabric elastane polyester spread-coated with polyurethane film, so as to obtain a uniform elastomer surface. A step in which the elastomer hardens occurs, waiting for the time for the cross-linking and hardening, up to forming the compact elastomeric layer 6.

The padding element thus obtained is thus trimmed. Such method, which provides both for the cross-linking of the gel 5 on the film or covering 4 and the cross-linking of the compact elastomer 6 on the gel 5 as well as on the film or covering 4, allows to obtain a padding element which comprises several materials but which is actually a monolithic body.

Lastly, the method comprises a step of applying glue, instantaneous glue, bi-adhesive tapes, or releasable adhesion means, or locking means, of the fixed or releasable type, etcetera, on the surface 9 of the compact elastomeric layer 6 and/or on the contact surface of the support structure 30 to be coated with the padding element 1, in order to determine the coupling of the compact elastomeric layer 6, or the entire padding element 1, to the support structure 30.

It is thus observed how the method according to the present invention is simple and made up of a limited number of steps, so as to reduce production time and relative production costs.

It has thus been observed that the invention attains the proposed objects.

The present invention was described according to preferred embodiments, but equivalent variants may be conceived without departing from the scope of protection provided for by the claims that follow.

Figure 5:
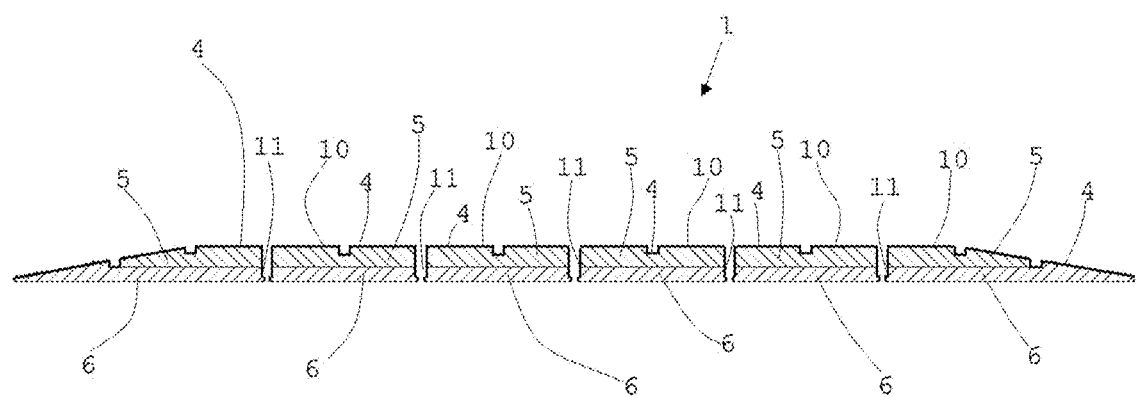
FIG. 5 is a cross-sectional view of a particular embodiment of the padding element according to the present invention.

Thus for example, the padding element according to the present invention may have a plurality of through openings 13 (in particular reference shall be made to FIG. 5) designed to allow the transpiration and thermal regulation of the parts of the body of the user in contact with the padding element 1 and/or the passage of liquids, for example in the case where the padding element according to the present invention is a shower mat or a wheelchair cushion.

Advantageously, the plurality of through openings 13 also serves as a seat for housing engagement or fixing means between the support framework and the padding element. The engagement or fixing means could comprise, for example, screws or buttons, the latter being provided for anchored to the support framework and insertable in the through openings 13 serving as corresponding slots.

The through openings 13 may have various configurations, for example circular, and they are advantageously obtained at the grooves 11, for example by punching or laser cutting the padding element, once the latter is obtained according to the aforementioned method.

Should the padding element 1 be used for an antidecubitus seat or as a shower mat, the internal light of the through openings is made impermeable, for example through one of the methods illustrated above with reference to the waterproofing of the coating 4, or else it can be waterproofed, so that, in both cases, the body fluids or water at contact with the padding element may be easily drained.

The invention claimed is:

1. A padding element for seats including sofas, armchairs, seats, armrests, wherein said seats have a support structure for the human body or parts thereof, including rest or anti-fatigue mats, anti-decubitus mattresses, shower mats, anti-impact mats;
    wherein said padding element comprises:
        a film having a bottom surface and a top support surface, wherein said top support surface is for contacting a user;
        a gel layer having a hardness D' and being cross-linked with the bottom surface of said film; and
        a compact elastomeric layer comprising a non-expanded elastomer having a hardness D" greater than said hardness D' of said gel layer and including a first surface directly contacting and being cross-linked with at least said gel layer and said film, and a second surface for directly contacting the support structure, wherein each of said film or covering, said gel layer and said compact elastomeric layer are substantially parallel to one another, wherein said film, the gel layer, and said compact elastomeric layer form a monolithic body,
    wherein said gel layer and said film comprise distribution heads on said padding element for contact with the human body, wherein said heads are separated by grooves between said heads, and wherein said heads and grooves are formed by said film and by a partial thickness of said gel layer, wherein said grooves are air circulation grooves further comprising through holes.

2. The padding element according to claim 1, wherein said film comprises a polyurethane film, a fleece-type fabric, an elastic net, a waterproofed fabric, a high-elasticity fabric, a waterproofed high-elasticity fabric, a polyester-elastane fabric, a waterproofed polyester-elastane fabric, a fabric spread-coated with a waterproof material, a fabric spread-coated with a polyurethane material, or a polyurethane paint, wherein said film or said top support surface show a surface finishing surface grain, wherein said surface finishing is ornamental, shiny, glossy, or opaque, and/or wherein said film or said support surface has a colouring, is at least partially transparent, or has a watermark transparency.

3. The padding element according to claim 1, wherein said film is vacuum thermo-formed.

4. The padding element according to claim 1, wherein said hardness D' is a Shore 00 hardness equal to zero or a Shore 000 hardness lower than 60.

5. The padding element according to claim 1, wherein said hardness D" is a Shore 00 hardness greater than 10.

6. The padding element according to claim 1, wherein said gel layer and/or said compact elastomeric layer is at least partially transparent or covering and/or coloured, or wherein said compact elastomeric layer is coloured and said film or covering and said gel layer are transparent.

7. The padding element according to claim 1, wherein said padding element comprises a coating layer, wherein said coating layer comprises a polyurethane coating or a polyurethane paint.

8. The padding element according to claim 1, wherein said padding element comprises, between said polyurethane gel layer and said film and/or between said polyurethane gel layer and said compact elastomeric layer, at least one ornamental element, an ornamental insert, a logo, a label, a writing, a colour, or an advertisement element of the two or three-dimensional type.

9. The padding element according to claim 1, wherein said gel layer is a polyurethane gel layer and/or said compact elastomeric layer is a polyurethane elastomer.

10. The padding element according to claim 1, wherein said compact elastomeric layer at least one of adhesive, non-slip, or non-adhesive.

11. A method for making a padding element of claim 1 for seats such as sofas, armchairs, seats, armrests, wherein said seats have a support structure, and similar support structures for the human body or parts thereof, such as rest or anti-fatigue mats, antidecubitus mattresses, shower mats, anti-impact mats, wherein said padding element is equipped with a support surface for a user, comprising the following steps of:
    providing a mould having a surface,
    providing said film, wherein said providing step comprises inserting or spraying said film in said mould,
    pouring a gel on at least part of said film,
    waiting a time interval to make said gel cross-link, in order to obtain said gel layer and to make said gel layer adhere to at least part of said film,
    pouring an elastomer,
    waiting a time interval to make said elastomer set in order to obtain said compact elastomeric layer and to make said compact elastomeric layer adhere to said gel layer and to at least part of said film.

12. The method according to claim 11, wherein said step of providing a film or covering comprises:
    a step of vacuum thermoforming said film and/or
    said step of providing a film provides a film of polyurethane, a fleece-type fabric, an elastic net, a waterproofed fabric, a high-elasticity fabric, a waterproofed high-elasticity fabric, a polyester-elastane fabric, or a waterproofed polyester-elastane fabric, a fabric spread-coated with a waterproof material, a fabric spread-coated with a polyurethane material, or a polyurethane paint, wherein said film or covering is at least partially transparent or covering or it has a "watermark" transparency, or other suitable finishes, and/or
    a step of providing a surface finishing or surface grain, an ornamental finishing, or a shiny or glossy or opaque finishing, and/or colouring said film or covering.

13. The method according to claim 11, wherein said step of pouring said gel comprises:
   a step of pouring a polyurethane gel having said hardness D' and/or
   a step of pouring a gel having said hardness D' being a Shore 00 hardness equal to zero or a Shore 000 hardness lower than 60.

14. The method according to claim 11, wherein said step of pouring said elastomer comprises:
   a step of pouring a polyurethane elastomer having said hardness D" and/or
   a step of pouring an elastomer having said hardness D" being a Shore 00 hardness D" of more than 10.

15. The method according to claim 11, comprising a step of coating or spraying or painting said compact elastomeric layer, so as to obtain a coating layer, wherein said coating layer comprises a polyurethane coating or a polyurethane paint.

16. The method according to claim 11, comprising the following steps:
   trimming said padding element or said film or covering or said coating layer, and/or
   inserting and/or positioning at least one ornamental element, an ornamental insert, a logo, a label, a writing, a colour, or an advertising element of the two and/or three-dimensional type, between said gel layer and said film or covering and/or between said gel layer and said compact elastomeric layer, and/or
   applying glues, instant glues, bi-adhesives, or releasable adhesion means, or locking means, of the foxed or releasable type, or combinations thereof, onto said compact elastomeric layer and/or onto a coating layer covering the compact elastomeric layer and/or onto the support structure and applying said padding element onto said support structure.

17. The method according claim 11, wherein said step of providing a mould having a surface comprises providing at least one distribution of projections or ridges and a distribution of valleys on said surface, wherein said valleys are located between said projections or ridges, and/or a distribution of crests on said valleys to form said distribution heads separated by said grooves.

18. A padding element, wherein said padding element consists of a first area contiguous with and adjoined in a graduated manner to a peripheral area via an intermediate area, said padding element comprising:
   a film having a bottom surface and a top support surface, wherein said top support surface is for contact with a user;
   wherein the first area comprises a gel layer having a hardness D' and adhering to the bottom surface of said film, and a compact elastomeric layer comprising a non-expanded elastomer having a hardness D" greater than said hardness D' of said gel layer and including a first surface directly adhered to said gel layer, and a second surface;
   wherein the peripheral area comprises said compact elastomeric layer having a graduated thickness forming a sloped edge and having a first surface of said compact elastomeric layer directly adhered to said bottom surface of said film,
   wherein said first and peripheral areas are adjoined via an intermediate area comprising said gel layer having a graduated thickness forming a continuation of said sloped edge and adhering to the bottom surface of said film, and said compact elastomeric layer including a first surface directly adhered to said gel layer, and a second surface, wherein the padding element forms a monolithic body, and
   wherein said film and said gel layer of said first and intermediate areas comprise a plurality of distribution heads, wherein said heads are separated by grooves between said heads.

19. The padding element according to claim 18, wherein said film comprises a polyurethane film, a fleece-type fabric, an elastic net, a waterproofed fabric, a high-elasticity fabric, a waterproofed high-elasticity fabric, a polyester-elastane fabric, a waterproofed polyester-elastane fabric, a fabric spread-coated with a waterproof material, a fabric spread-coated with a polyurethane material, or a polyurethane paint, wherein said film or said top support surface show a surface finishing surface grain, wherein said surface finishing is ornamental, shiny, glossy, or opaque, and/or wherein said film or said support surface has a colouring, is at least partially transparent, or has a watermark transparency.

20. The padding element according to claim 18, wherein said hardness D' is a Shore 00 hardness D' equal to zero or a Shore 000 hardness D' lower than 60.

21. The padding element according to claim 18, wherein said hardness D" is a Shore 00 hardness greater than 10.

22. The padding element according to claim 18, wherein said padding element comprises, between said polyurethane gel layer and said film and/or between said polyurethane gel layer and said compact elastomeric layer, at least one ornamental element, an ornamental insert, a logo, a label, a writing, a colour, or an advertisement element of the two or three-dimensional type.

23. The padding element according to claim 18, wherein said grooves being defined between air circulation grooves, a plurality of through openings being obtained in said grooves.

24. The padding element according to claim 18, wherein said compact elastomeric layer is at least one of adhesive, non-slip, or non-adhesive.

* * * * *